United States Patent
Bandel et al.

(10) Patent No.: US 10,270,240 B2
(45) Date of Patent: Apr. 23, 2019

(54) SURGE PROTECTIVE DEVICE WITH ABNORMAL OVERVOLTAGE PROTECTION

(71) Applicant: Hubbell Incorporated, Shelton, CT (US)

(72) Inventors: Michael Bandel, North Aurora, IL (US); Donald Huvaere, Palatine, IL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/761,971

(22) PCT Filed: Oct. 7, 2016

(86) PCT No.: PCT/US2016/055903
§ 371 (c)(1),
(2) Date: Mar. 21, 2018

(87) PCT Pub. No.: WO2017/062715
PCT Pub. Date: Apr. 13, 2017

(65) Prior Publication Data
US 2018/0269678 A1    Sep. 20, 2018

Related U.S. Application Data

(60) Provisional application No. 62/326,234, filed on Apr. 22, 2016, provisional application No. 62/238,915, filed on Oct. 8, 2015.

(51) Int. Cl.
*H02H 3/00* (2006.01)
*H02H 9/00* (2006.01)
(Continued)

(52) U.S. Cl.
CPC .......... *H02H 7/20* (2013.01); *H02H 1/0007* (2013.01); *H02H 3/00* (2013.01); *H02H 3/202* (2013.01);
(Continued)

(58) Field of Classification Search
CPC .......... H02H 9/041; H02H 3/20; H02H 9/04; H02H 3/08; H02H 9/043; H02H 1/0015;
(Continued)

(56) References Cited

U.S. PATENT DOCUMENTS 5,028,825 A    7/1991    Smith et al.
5,410,366 A *  4/1995    Hostetler ............... H04N 5/18
                                               348/691
(Continued)

FOREIGN PATENT DOCUMENTS

EP    0 692 925    1/1996

OTHER PUBLICATIONS

PCT International Search Report & Opinion for corresponding PCT Application No. PCT/US2016/55903, dated Dec. 30, 2016—10 pages.
(Continued)

*Primary Examiner* — Vibol Tan
(74) *Attorney, Agent, or Firm* — Dority & Manning, P.A.

(57) ABSTRACT

Surge protective devices having surge protective and overvoltage protection capability are provided. In one example embodiment, the surge protective device can include a surge protection circuit. The surge protection device can include an overvoltage protection circuit coupled in series with the surge protection circuit. The overvoltage protection circuit can include a voltage sensing circuit associated with a voltage threshold, one or more switching elements, and/or a gating circuit coupled to the voltage sensing circuit. The gating circuit can be configured to control the one or more
(Continued)

switching elements to be in a non-conducting state when the voltage sensing circuit detects a voltage that exceeds the voltage threshold.

17 Claims, 11 Drawing Sheets

(51) Int. Cl.
| | |
|---|---|
| *H02H 7/20* | (2006.01) |
| *H02H 3/22* | (2006.01) |
| *H02H 9/04* | (2006.01) |
| *H02H 3/20* | (2006.01) |
| *H05B 33/08* | (2006.01) |
| *H02H 1/00* | (2006.01) |
| *H01C 7/12* | (2006.01) |

(52) U.S. Cl.
CPC .............. *H02H 3/22* (2013.01); *H02H 9/04* (2013.01); *H02H 9/045* (2013.01); *H05B 33/0887* (2013.01); *H01C 7/12* (2013.01); Y02B 20/341 (2013.01)

(58) Field of Classification Search
CPC .. H02H 3/10; H02H 3/22; H02H 3/05; H02H 3/085; H02H 9/042; H01C 7/12; H01R 9/2641; G05F 1/571; G05F 1/573
See application file for complete search history.

(56) References Cited

U.S. PATENT DOCUMENTS

| | | | | |
|---|---|---|---|---|
| 6,169,425 | B1* | 1/2001 | Spires | G01R 19/00 |
| | | | | 327/50 |
| 8,605,400 | B2* | 12/2013 | Wetter | H02H 9/041 |
| | | | | 361/111 |
| 2002/0126433 | A1 | 9/2002 | Hoopes | |
| 2006/0119292 | A1 | 6/2006 | Black et al. | |
| 2008/0198527 | A1 | 8/2008 | Higashi et al. | |
| 2012/0063048 | A1 | 3/2012 | Divan et al. | |
| 2012/0296890 | A1 | 11/2012 | Adiga-Manoor et al. | |
| 2013/0016448 | A1 | 1/2013 | George et al. | |
| 2013/0100710 | A1 | 4/2013 | Kang et al. | |
| 2014/0055898 | A1* | 2/2014 | Kostakis | H02H 3/20 |
| | | | | 361/91.5 |
| 2015/0362944 | A1* | 12/2015 | Sporck | G05F 5/00 |
| | | | | 323/303 |
| 2016/0056127 | A1* | 2/2016 | Lee | H01L 25/0657 |
| | | | | 257/659 |
| 2016/0322901 | A1* | 11/2016 | Sato | H01L 29/407 |

OTHER PUBLICATIONS

PCT International Preliminary Report on Patentability for corresponding PCT Application No. PCT/US2016/55903, dated Apr. 10, 2018—9 pages.

* cited by examiner

SURGE PROTECTIVE DEVICE WITH ABNORMAL OVERVOLTAGE PROTECTION

The present application is a 371 of International Application No. PCT/US2016/055903 filed on Oct. 7, 2016, which claims priority to U.S. Provisional Application No. 62/326,234 filed on Apr. 22, 2016 and U.S. Provisional Application No. 62/238,915 filed on Oct. 8, 2015, which is incorporated herein in its entirety by reference thereto.

FIELD

The present disclosure relates generally to surge protective devices, and more particularly to surge protective devices that can provide abnormal overvoltage protection.

BACKGROUND

Surge protective devices can be used to assist in protecting loads from electrically induced damage. Surge protective devices are typically designed to deal with short duration, high magnitude voltage and/or current events on the electrical wiring system. These events can last from several microseconds to several milliseconds and can be attributable to, for instance, switching loads on and off, lightning strikes, equipment failures, faults, etc. A surge protective device can absorb these events by clamping them to more manageable magnitudes. In this process, a surge protective device can heat up and eventually wear out.

There can be other events that can occur in an electrical system that can negatively affect load life and that may not be mitigated by a surge protective device. For example, an electrical system can exhibit voltage sags or swells. Electrical systems typically exhibit non-linear, reactive characteristics that can cause various undervoltage events, overvoltage events, oscillations, and/or some combination thereof which can be transient or even of longer term duration. One detrimental event can be a long duration, abnormal overvoltage condition, (e.g., swell). Loads are rated for operation on an electrical wiring supply and system at a particular nominal voltage, but usually are specified to work in a tolerance range around the nominal voltage. Experiencing an overvoltage condition for an extended period of time above the high side tolerance can cause some loads to be damaged.

SUMMARY

Aspects and advantages of embodiments of the present disclosure will be set forth in part in the following description, or may be learned from the description, or may be learned through practice of the embodiments.

One example aspect of the present disclosure is directed to a surge protective device. The surge protective device can include a surge protection circuit. The surge protective device can include an overvoltage protection circuit. The overvoltage protection circuit can be coupled in series with the surge protection circuit. The overvoltage protection circuit can include a voltage sensing circuit (e.g., a string of one or more Zener diodes or other voltage sensing circuit) associated with a voltage threshold. The overvoltage protection circuit can include one or more switching elements. The overvoltage protection circuit can include a gating circuit coupled to voltage sensing circuit. The gating circuit can be configured to control the one or more switching elements to be in a non-conducting state when the voltage sensing circuit detects a voltage that exceeds the voltage threshold. The gating circuit can be configured to control the one or more switching elements to be in a conducting state when the voltage sensing circuit detects a voltage that does not exceed the voltage threshold.

Another example aspect of the present disclosure is directed to a surge protective device for a lighting system. The surge protective device can include a surge protection circuit. The surge protective device can include an overvoltage protection circuit coupled in series with the surge protection circuit. The overvoltage protection circuit can include a relay configured to operate in a normally closed position. The overvoltage protection circuit can include a bridge rectifier. The overvoltage protection circuit can include a first circuit section coupled to the bridge rectifier and the relay. The first circuit section can be configured to control operation of the relay based on an overvoltage detection signal. The overvoltage protection circuit can include a second circuit section. The second circuit section can be coupled to the bridge rectifier and the first circuit section. The second circuit section can be configured to provide the overvoltage detection signal. The first circuit section can be configured to control the relay to be in an open state when the overvoltage detection signal is indicative of an overvoltage condition.

Another example aspect of the present disclosure can include a surge protective device. The surge protective device can include surge protection means for protecting a load from a short duration, high magnitude transient condition. The surge protective device can include overvoltage protection means for protecting the load from an overvoltage condition.

Other example aspects of the present disclosure are directed to circuits, devices, systems, and methods for providing overvoltage protection for one or more loads.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
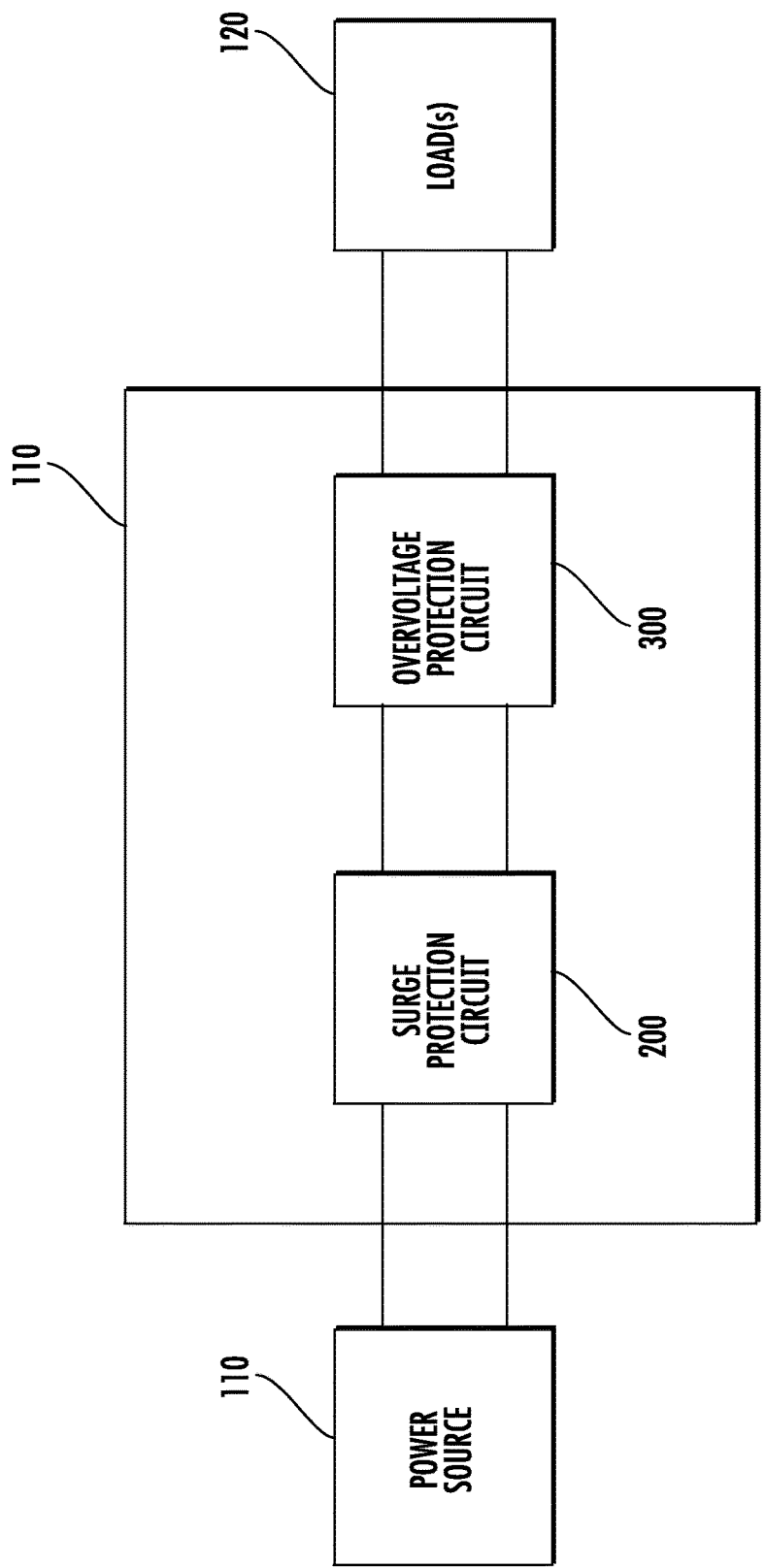
FIG. 1 depicts a block diagram of an example surge protective device according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to surge protective devices that combine surge protective functionality with abnormal overvoltage detection and shutdown capability. More particularly, a surge protective device can include a surge protection circuit and an overvoltage protection circuit. The surge protection circuit can be configured to protect loads from high magnitude short duration transient conditions and power surges. The overvoltage protection circuit can be configured to protect the load from lower magnitude, but perhaps longer duration, overvoltage conditions. In some embodiments, the surge protection circuit can protect loads from a voltage condition associated with a first magnitude and the overvoltage protection circuit can protect loads from a voltage condition associated with a second magnitude. In some embodiments, the first magnitude can be greater than the second magnitude, such as at least two times greater than the second magnitude, such as at least ten times greater than the second magnitude. The surge protection circuit and the overvoltage protection circuit can be included within the same housing or module.

According to example aspects of the present disclosure, the surge protection circuit can include one or more surge protection elements such as one or more fuses, breakers, metal oxide varistors (MOVs), gas discharge tubes, Zener diodes, transient voltage suppression (TVS) diodes, thyristors, electrostatic discharge protection devices, and/or other surge protection elements. The surge protective elements can be configured to absorb short duration power surges and/or can be configured to disconnect power from the load during short duration power surges. In some embodiments, the surge protection circuit can include MOVs coupled between a first AC line and a second AC line as well as between the first AC line and a reference (e.g., ground reference) and the second AC line and the reference. Fuse elements can be coupled in series with one or more of the MOVs to provide additional surge protection capability.

The overvoltage protection circuit can be coupled in series with the surge protection circuit. The overvoltage protection circuit can include one or more switching elements, such as one or more transistors (e.g., MOSFETs), one or more relays, or other suitable switching elements. The one or more switching elements can be controlled to be normally in a conducting state to conduct power to a load. A voltage sensing circuit (e.g., a string of one or more Zener diodes or other voltage sensing circuit) can be coupled to a gating circuit. Upon the occurrence of an overvoltage condition, the voltage sensing circuit can trigger operation of the gating circuit to control the one or more switching elements to be in a non-conducting state. When in the non-conducting state, the overvoltage protection circuit can disconnect power from the load.

The one or more switching elements can remain in the non-conducting state until the overvoltage condition has terminated. At this point, the voltage sensing circuit can trigger the gating circuit to cause the one or more switching elements to return to a conducting state and to deliver power to the load. In this way, the overvoltage protection circuit can prevent damage to the load resulting from lower magnitude overvoltage conditions.

FIG. 1 depicts a block diagram of an example surge protective device 100 according to example embodiments of the present disclosure. As shown, the surge protective device 100 can receive input power from a power source 110. The power source 110 can be any suitable power source, such as a single phase AC power source, multiphase AC power source (e.g., three-phase power source), DC power source, or other suitable power source. In one example implementation, the power source is a single phase AC power source having a first AC line associated with a first AC potential (positive or negative AC voltage) and a second AC line associated with a second AC potential (e.g., a neutral).

The surge protective device 100 can be coupled between the power source 110 and a load 120. The load 120 can be any suitable load that draws power from the power source 110, such as one or more lighting systems or other suitable loads. The surge protective device 100 can include a surge protection circuit 200 that is coupled in series with an overvoltage protection circuit 300.

In some embodiments, the surge protection circuit 200 can be surge protection means for protecting the load 120 from high magnitude short duration transient conditions and power surges. The surge protection means can include any of the surge protection circuits 200 disclosed herein, including the surge protection circuits 200 shown in FIGS. 2 and 3 and equivalents thereof.

In some embodiments, the overvoltage protection circuit 300 can be overvoltage protection means for protecting protect the load 120 from lower magnitude, longer duration overvoltage conditions. The overvoltage protection means can include any of the overvoltage protection circuits 300 disclosed herein, including the overvoltage protection circuits 300 shown in FIGS. 4-11 and equivalents thereof.

Figure 2:
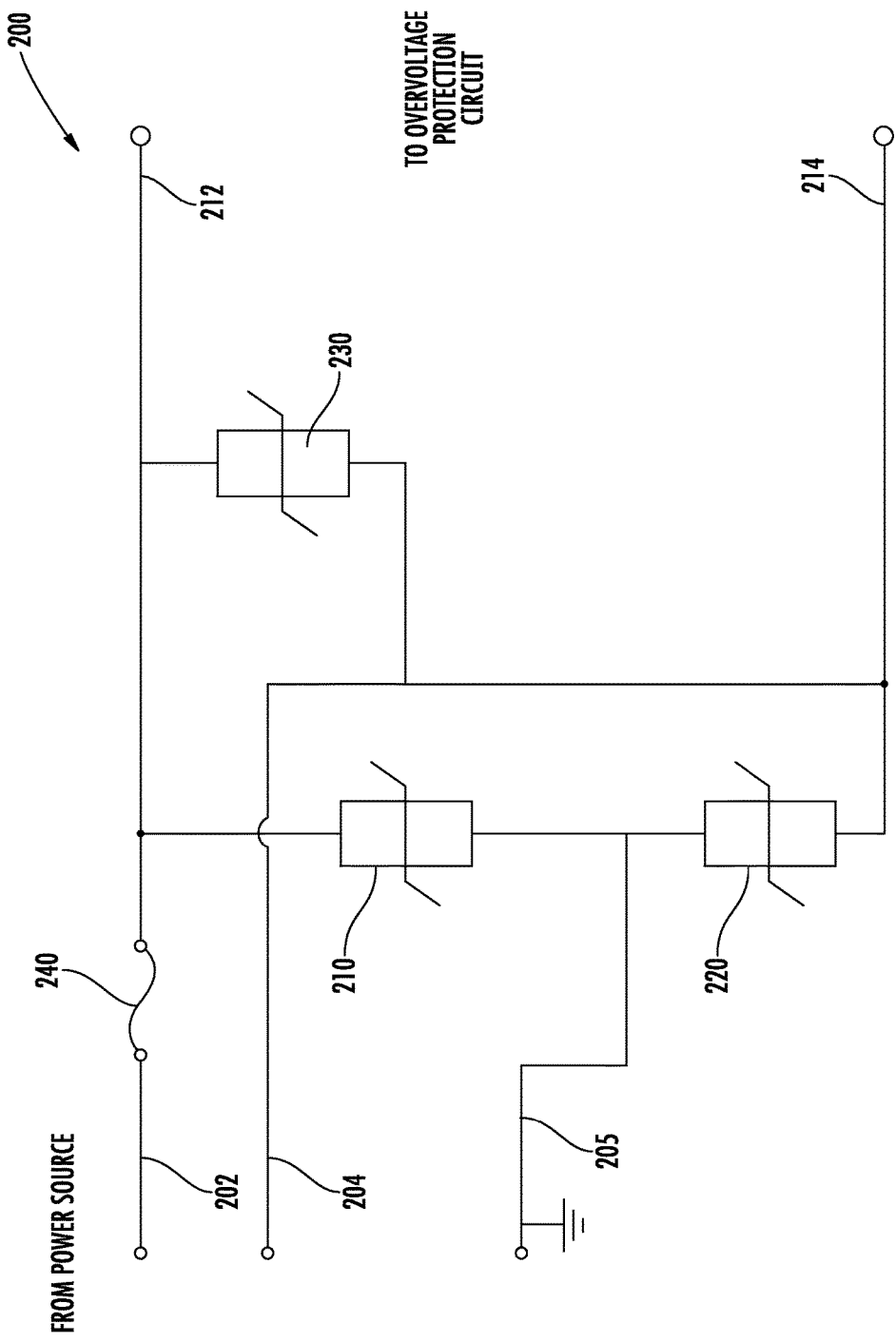
FIG. 2 depicts a circuit diagram of an example surge protection circuit according to example embodiments of the present disclosure.

FIG. 2 depicts a circuit diagram of one example surge protection circuit 200 according to example embodiments of the present disclosure. The surge protection circuit 200 can receive power from a single phase AC power source in the form a first AC line input 202 and a second AC line input 204. The first AC line input 202 can be associated with a first AC potential (e.g., +120 V, −120 V, etc.) and the second AC line input 204 can be associated with a second AC potential (e.g., 120 V, −120V, 0V, etc.). In some embodiments, the first AC line input 202 is associated with a positive or negative AC potential and the second AC line input 204 is associated with a neutral. A reference 205 (e.g., a ground reference) can also be included as part of the input to the surge protection circuit 200.

The surge protection circuit 200 can provide a first AC input 212 and a second AC input 214 to the overvoltage protection circuit 300. Similar to the AC line inputs 202 and 204, the first AC input 212 can be associated with a first AC potential (e.g., +120 V, −120 V, etc.) and the second AC input 204 can be associated with a second AC potential (e.g., 120 V, −120V, 0V, etc.). In some embodiments, the first AC input 212 is associated with a positive or negative AC potential and the second AC input 214 is associated with a neutral.

The surge protection circuit 200 includes surge protective elements coupled between each of the respective AC line inputs and/or the reference. For instance, as shown in FIG. 2, the surge protection circuit 200 includes a first MOV 210 coupled between the first AC line input 202 and the reference 205. The surge protection circuit 200 includes a second MOV 220 coupled between the second AC line input 204 and the reference 205. The surge protection circuit 200 includes a third MOV 230 coupled between the first AC line input 202 and the second AC line input 204.

The first MOV 210 can provide protection by clamping AC voltage during current surges between the first AC line 202 and the reference 205. The second MOV 220 can provide protection by clamping AC voltage during current surges between the second AC line 204 and the reference 205. The third MOV 230 can provide protection by clamping AV voltages during current surges between the first AC line 202 and the second AC line 204.

The surge protection circuit 200 is discussed with reference to MOV surge protective elements for purposes of illustration and discussion. Those of ordinary skill in the art, using the disclosures provided herein, will understand that other surge protective elements can be used without deviating from the scope of the present disclosure, such as fuses, breakers, gas discharge tubes, Zener diodes, TVS diodes, thyristors, electrostatic discharge protection devices, and/or other surge protection elements In some embodiments, the surge protection circuit 200 can include other surge protective elements to provide additional surge protection capability. For instance, as shown in FIG. 2, the surge protection circuit 200 can include a fuse 240 coupled in series with first AC line input 202. The fuse 240 can be configured to open when a current higher than a fuse rating of the fuse 240 passes through the fuse 240.

Figure 3:
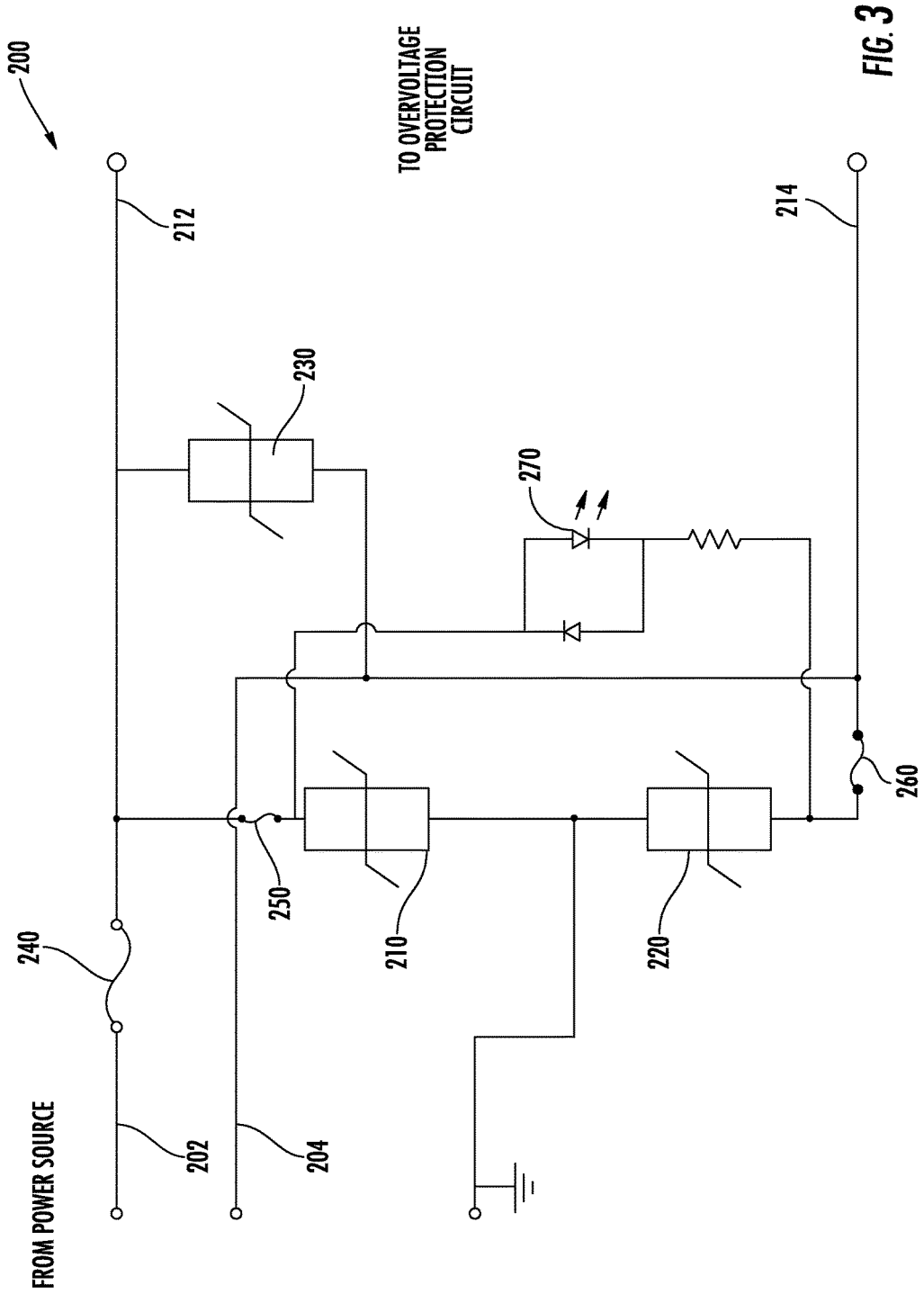
FIG. 3 depicts a circuit diagram of an example surge protection circuit according to example embodiments of the present disclosure.

FIG. 3 depicts a surge protection circuit 200 according to example embodiments of the present disclosure. The surge protection circuit 200 of FIG. 3 is similar to the surge protection circuit of FIG. 2 except that the surge protection circuit 200 of FIG. 3 includes an additional fuse 250 coupled in series with the first MOV 210 and an additional fuse 260 coupled in series with the second MOV 220. In addition, the surge protection circuit 200 includes a light emitting diode (LED) 270 that can be configured to emit light as an indicator when the surge protective circuit 200 is operational to protect a load from transient conditions.

Figure 4:
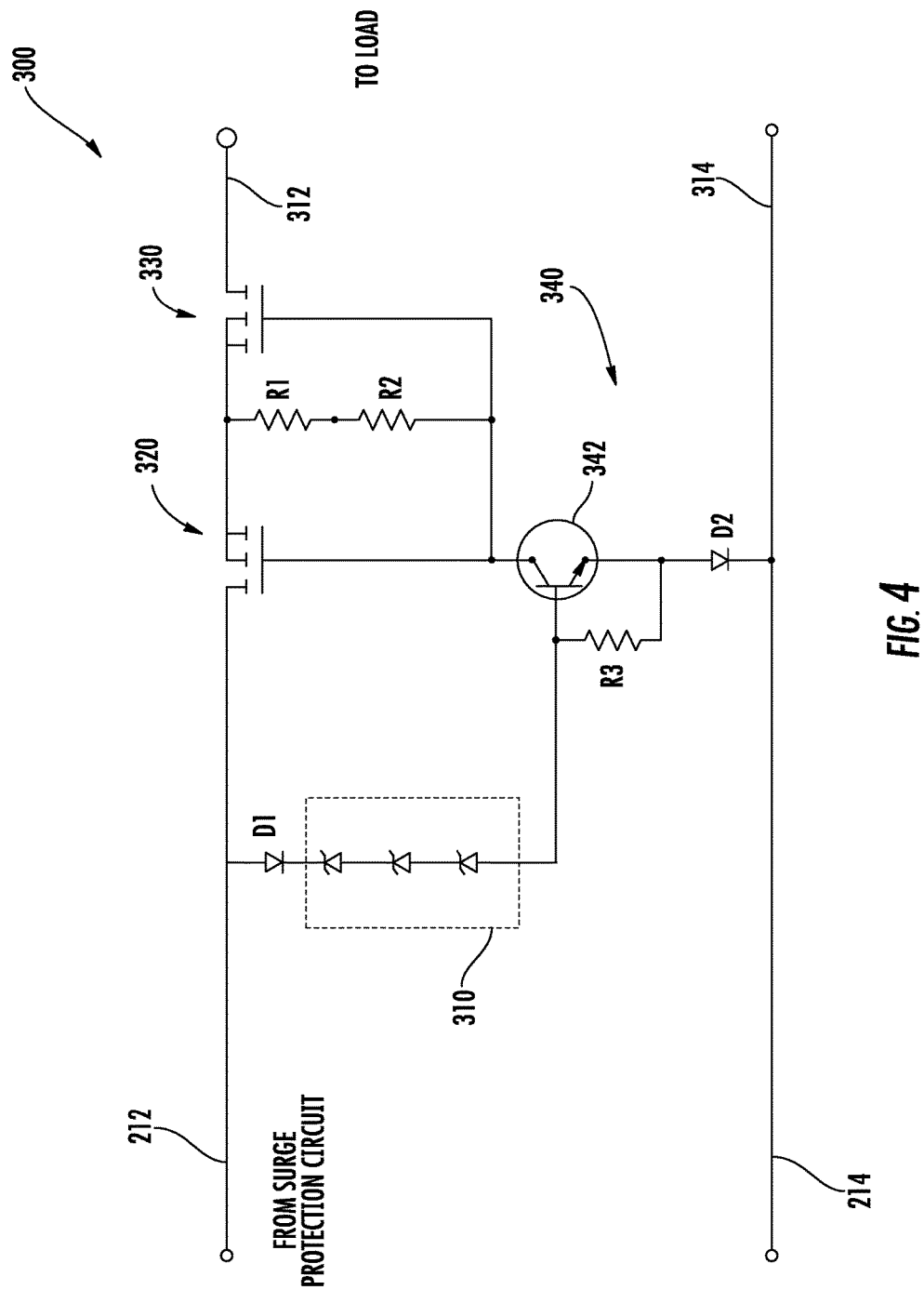
FIG. 4 depicts a circuit diagram of an example overvoltage protection circuit according to example embodiments of the present disclosure.

FIG. 4 depicts a circuit diagram of an example overvoltage protection circuit 300 according to example embodiments of the present disclosure. The overvoltage protection circuit 300 can receive AC power from the surge protection circuit 200 via AC input 212 and the AC input 214. The overvoltage protection circuit 300 includes a voltage sensing circuit that includes a string of Zener diodes 310. The overvoltage protection circuit 300 further includes a pair of switching elements 320 and 330. The pair of switching elements 320 and 330 can be configured to be normally in a conducting state so that power flows from the AC inputs 212, 214 to the load via outputs 312 and 314. The string of Zener diodes 310 can be coupled to a gating circuit 340. The gating circuit 340 can control operation of the switching elements 320 and 330 based on the voltage across the string of Zener diodes 310. For instance, when a voltage across the string of Zener diodes 310 exceeds a threshold level, the gating circuit 340 can control the switching elements 320 and 330 to be in a non-conducting state so that power does not flow from the AC inputs 212, 214 to the load via outputs 312 and 314.

More particularly, the overvoltage protection circuit 300 of FIG. 4 includes a string of Zener diodes 310 coupled between the AC input 212 and the AC input 214. Diodes D1 and D2 can be coupled series with the string of Zener diodes 310 so that the Zener diodes act on a half cycle (e.g., a positive cycle) of the AC power. The string of Zener diodes 310 can be configured to block current when the voltage between AC input 212 and AC input 214 is less than a threshold level. More particularly, each of the Zener diodes in the string of Zener diodes 310 can provide a blocking voltage capability up to a certain voltage blocking threshold. Coupling the Zener diodes in series can increase this blocking voltage capability. The amount and type of Zener diodes coupled in series can be selected to provide overvoltage protection up to a desired overvoltage protection threshold. The overvoltage protection threshold can be less than a magnitude of a voltage protection capability provided by the surge protection circuit 200.

Three Zener diodes are illustrated in the example embodiment of FIG. 4. Those of ordinary skill in the art, using the disclosures provided herein, will understand that more or fewer Zener diodes can be used in the string of Zener diodes 310 without deviating from the scope of the present disclosure.

The overvoltage protection circuit 300 further includes a first switching element 320 and a second switching element 330 coupled between the AC input 212 and the AC output 312. The first and second switching elements 320 and 330 can include MOSFET devices. In the example embodiment of FIG. 3, a drain of the first MOSFET switching element 320 can be coupled to the AC input 212 while the source of the first MOSFET switching element 320 and be coupled to the source of the second MOSFET switching element 330. The drain of the second MOSFET switching element 330 can be coupled to the load (e.g., via the AC output 312). The gate of the first MOSFET switching element 320 and the second MOSFET switching element 330 can be coupled to a gating circuit 340.

In the example embodiment of FIG. 4, the gating circuit 340 includes a bipolar junction transistor (BJT) switching element 342. Other suitable switching elements can be used in place of a BJT without deviating from the scope of the present disclosure, such as other suitable transistors. A base of the BJT switching element 342 is coupled to the string of Zener diodes 310. The gates of the MOSFET switching elements 320 and 330 are coupled to an emitter of the BJT switching element 342. In addition, resistors R1 and R2 are coupled to the emitter of the BJT switching element 342.

The gating circuit 340 is operable to control the MOSFET switching elements 320 and 330 to be normally in a conducting state to conduct power to the load. When an overvoltage condition occurs (e.g., when a blocking voltage capability of the Zener diodes is exceeded), the gating circuit 340 can be operable to control the MOSFET switching elements 320 and 330 to be in a non-conducting state to prevent power from being delivered to the load.

More particularly, the string of Zener diodes 310 can be operable to block current when the voltage of the AC input 212 does not exceed the blocking voltage capability of the string of Zener diodes 310. As a result, little to no current flows through resistor R3 and a voltage less than a turn on voltage is applied to the base of the BJT switching element 342 to operate the BJT switching element 342 in a non-conducting state. In this state, a gate voltage is applied to the gates of the MOSFET switching elements 320 and 330 sufficient to maintain the MOSFET switching elements 320 and 330 in a conducting state.

During an overvoltage condition when the AC voltage exceeds the blocking voltage capability of the string of Zener diodes 310, a current flows through the string of Zener diodes 310 and resistor R3 resulting in a higher voltage being applied to the base of the BJT switching element 342. This will operate the BJT switching element 342 in a conducting state. In this state, the gate voltage applied to the gates of the first MOSFET switching element 320 and the second MOSFET switching element 330 will be reduced, causing the first MOSFET switching element 320 and the second MOSFET switching element 330 to operate in a non-conducting state. AC power is not conducted to the load when the first MOSFET switching element 320 and the second MOSFET switching element 330 are operated in the non-conducting state.

When the overvoltage condition ceases to exist and the voltage between AC input 212 and AC input 214 is less than the blocking voltage capability of the string of Zener diodes 310, the current flowing through the string of Zener diodes 310 can be limited. This will reduce the voltage applied to the base of the BJT switching element 342 and will operate the BJT switching element 342 in a non-conducting state. In this state, a gate voltage will be applied to the MOSFET switching elements 320 and 330 to operate the MOSFET switching elements 320 and 330 in a conducting state so that power can be delivered to the load.

Variations and modifications can be made to the example overvoltage protection circuit 300 without deviating from the scope of the present disclosure. For instance, switching elements other than MOSFET switching elements 320 and 330 can be controlled to deliver power to the load based on the existence of an overvoltage condition. In addition, the gating circuit 340 can include additional and/or alternative elements to control the switching elements to selectively deliver power to the load based on the existence of an overvoltage condition.

Figure 5:
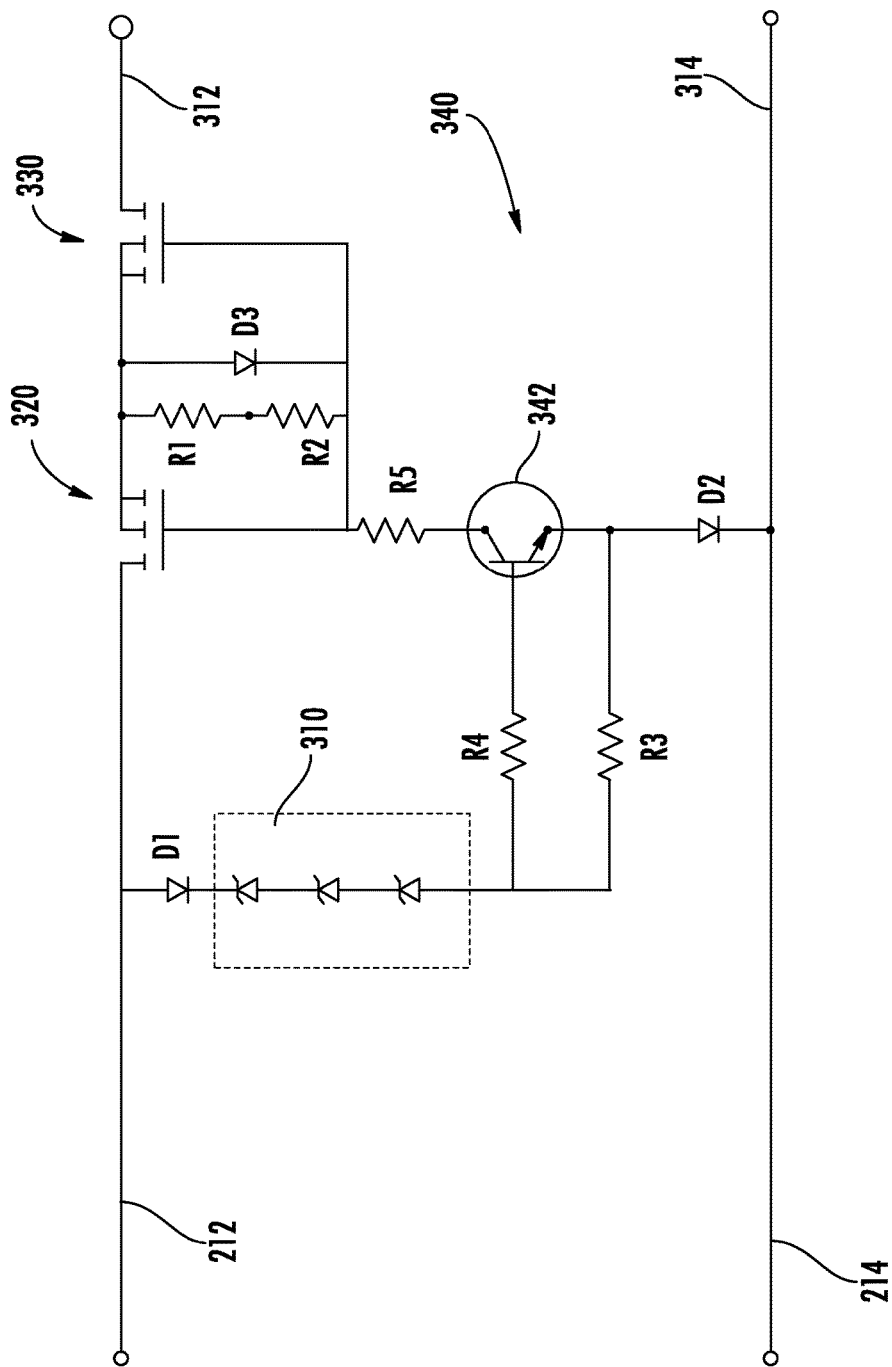
FIG. 5 depicts a circuit diagram of an example overvoltage protection circuit according to example embodiments of the present disclosure.

For example, FIG. 5 depicts an overvoltage protection circuit 300 according to another example embodiment of the present disclosure. The overvoltage protection circuit 300 of FIG. 5 is similar to that depicted in FIG. 4. However, the overvoltage protection circuit 300 of FIG. 5 includes an additional diode D3 and additional resistors R4 and R5 to provide, for instance, additional stability to the overvoltage protection circuit 300. The diode D3 can be used to limit the gate source voltage of the MOSFET switching elements 320 and 330. The resistor R4 can be coupled to the base of the BJT switching element 342 to limit base emitter current of the BJT switching element 342. The resistor R5 can be coupled to the emitter of the BJT switching element 342 to limit current through diode D2. Other components can be used in the overvoltage protection circuit without deviating from the scope of the present disclosure.

Figure 6:
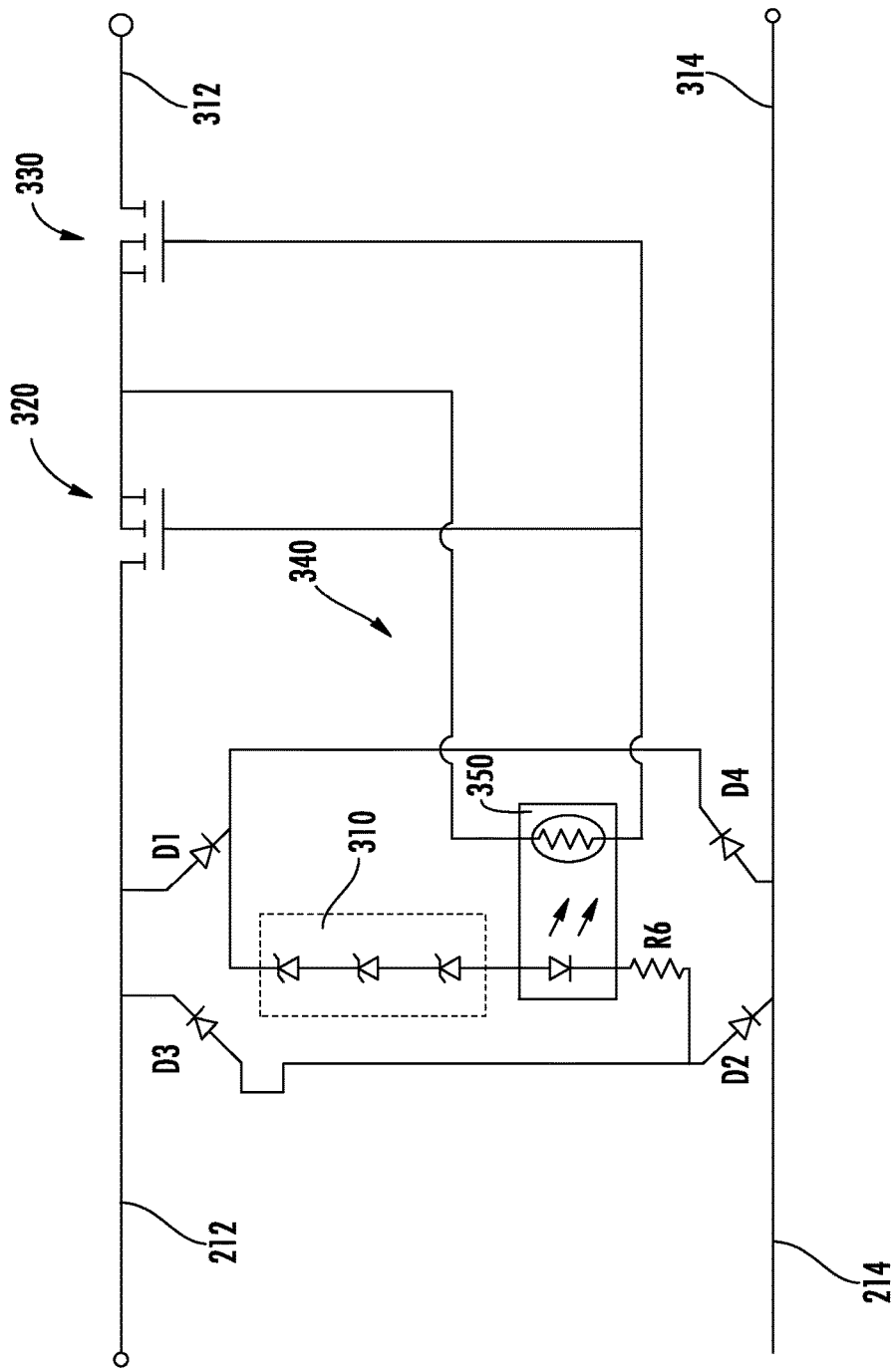
FIG. 6 depicts a circuit diagram of an example overvoltage protection circuit according to example embodiments of the present disclosure.

FIG. 6 depicts an example overvoltage protection circuit 300 according to yet another example embodiment of the present disclosure. The overvoltage protection circuit 300 includes a string of Zener diodes 310 and MOSFET switching elements 320 and 330. The MOSEFET switching elements 320 and 330 can be configured to be normally in a conducting state so that power flows from the AC inputs 212, 214 to the load via outputs 312 and 314. The string of Zener diodes 310 can be coupled to a gating circuit 340. The gating circuit 340 can control operation of the switching elements 320 and 330 based on the voltage across the string of Zener diodes 310. For instance, when a voltage across the string of Zener diodes 310 exceeds a threshold level, the gating circuit 340 can control the switching elements 320 and 330 to be in a non-conducting state so that power does not flow from the AC inputs 212, 214 to the load via outputs 312 and 314.

The gating circuit 340 of FIG. 6 can include an optocoupler 350. The optocoupler 350 can be configured to apply an output voltage based at least in part on light emitted by a light emitting diode in the optocoupler 350. The state of the optocoupler 350 can be used to control the state of the MOSFET switching elements 320 and 330.

More specifically, the string of Zener diodes 310 can receive AC power through rectifier diodes D1, D2, D3, and D4. When the AC voltage does not exceed the blocking voltage capability of the string of Zener diodes 310, the optocoupler 250 provides no signal to the gates of the MOSFET switching elements 320 and 330 leaving the MOSFET switching elements 320 and 330 in a normal conducting state so that power can be delivered to the load. During an overvoltage condition, when the AC voltage exceeds a blocking voltage capability of the string of Zener diodes 310, current can flow through Zener diodes 310 and resistor R6, activating the optocoupler 350. In this state, the MOSFET switching elements 320 and 330 are controlled to be in a non-conducting state so that power is not delivered to the load. The MOSFET switching elements 320 and 330 can remain in this state until the overvoltage condition has ceased to exist and the AC voltage no longer exceeds a blocking voltage capability of the string of Zener diodes 310. Variations and modifications can be made to this example overvoltage protection circuit 300 without deviating from the scope of the present disclosure.

Figure 7:
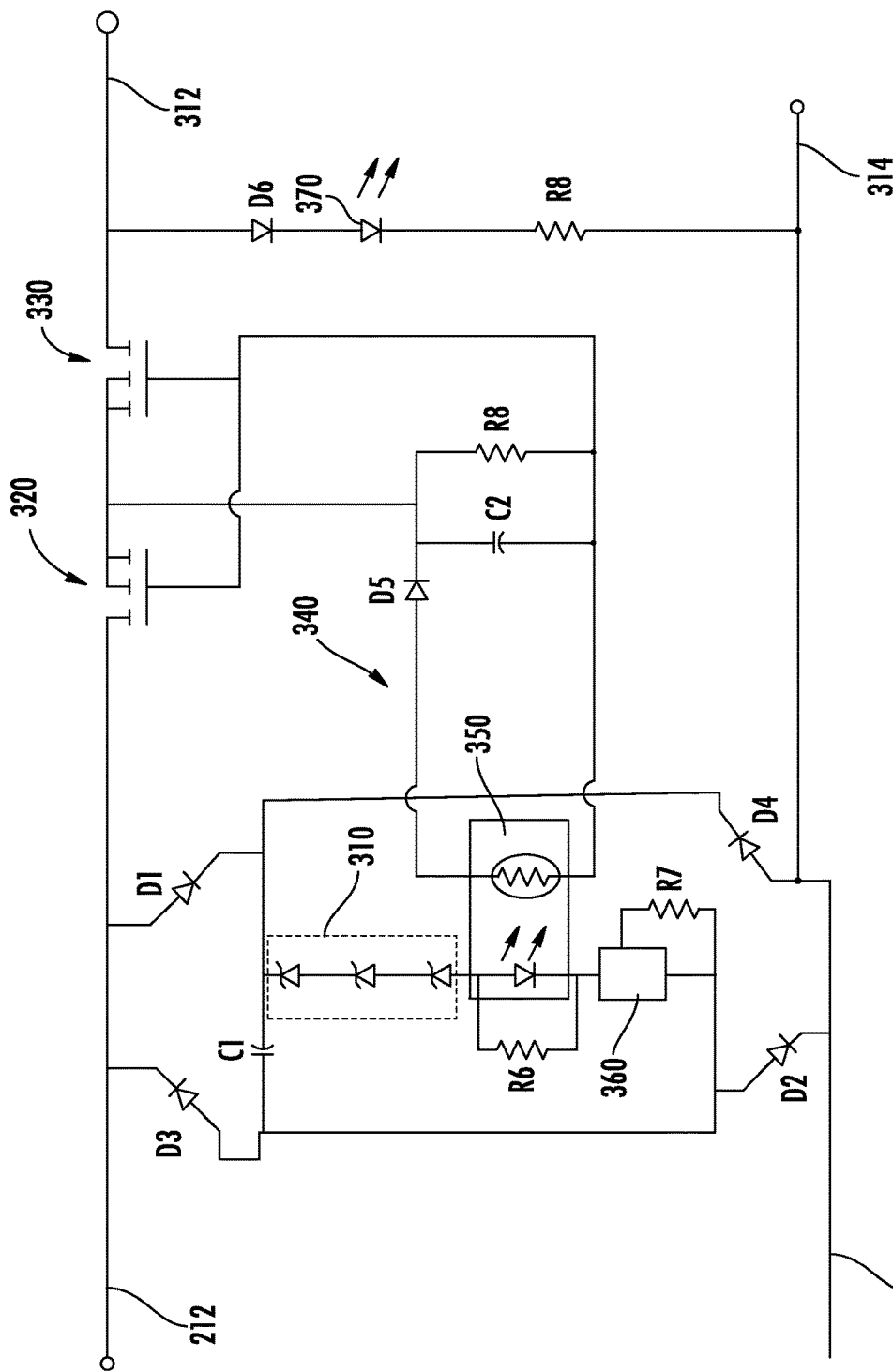
FIG. 7 depicts a circuit diagram of an example overvoltage protection circuit according to example embodiments of the present disclosure.

For instance, FIG. 7 depicts an overvoltage protection circuit 300 having a gating circuit 340 that includes an optocoupler 350 according to example embodiments of the present disclosure. The overvoltage protection circuit 300 of FIG. 7 is similar to that of FIG. 6, except that the overvoltage protection circuit 300 of FIG. 7 additionally includes a current regulator 360 coupled in series with the optocoupler 350. The current regulator 360, in conjunction with resistors R6 and R7, can be used to limit current through the Zener diodes 310 and the optocoupler 350. The current regulator 360 can be a constant current regulator that may or may not be adjustable.

In one embodiment, the current regulator 360 can be a switchable current regulator having a gate terminal, a positive terminal, and a negative terminal. The gate terminal can be coupled to resistor R7. The positive terminal can be coupled to the optocoupler 350. The negative terminal can be coupled to the AC input 214 through diode D2. In one embodiment, the current regulator 360 is an IXCP 10M45S current regulator manufactured by IXYS Corporation.

In the example embodiment of FIG. 7, the gating circuit 340 additionally includes capacitors C1 and C2, diode D5, and resistor R8 to provide, for instance, additional stability to the gating circuit 340. Additionally, the overvoltage protection circuit 300 can include an LED circuit. The LED circuit can include an LED 370 coupled in series with a diode D6 and a resistor R8. The LED 370 can be configured to emit light when the MOSFET switching elements 320 and 330 are in a conducting state. The LED 370 can be configured to not emit light when the MOSFET switching elements 320 and 330 are not in the conducting state. In this way, the LED circuit can provide an indicator as to whether the overvoltage protection circuit 300 is delivering power to the load or not delivering power to the load.

Figure 8:
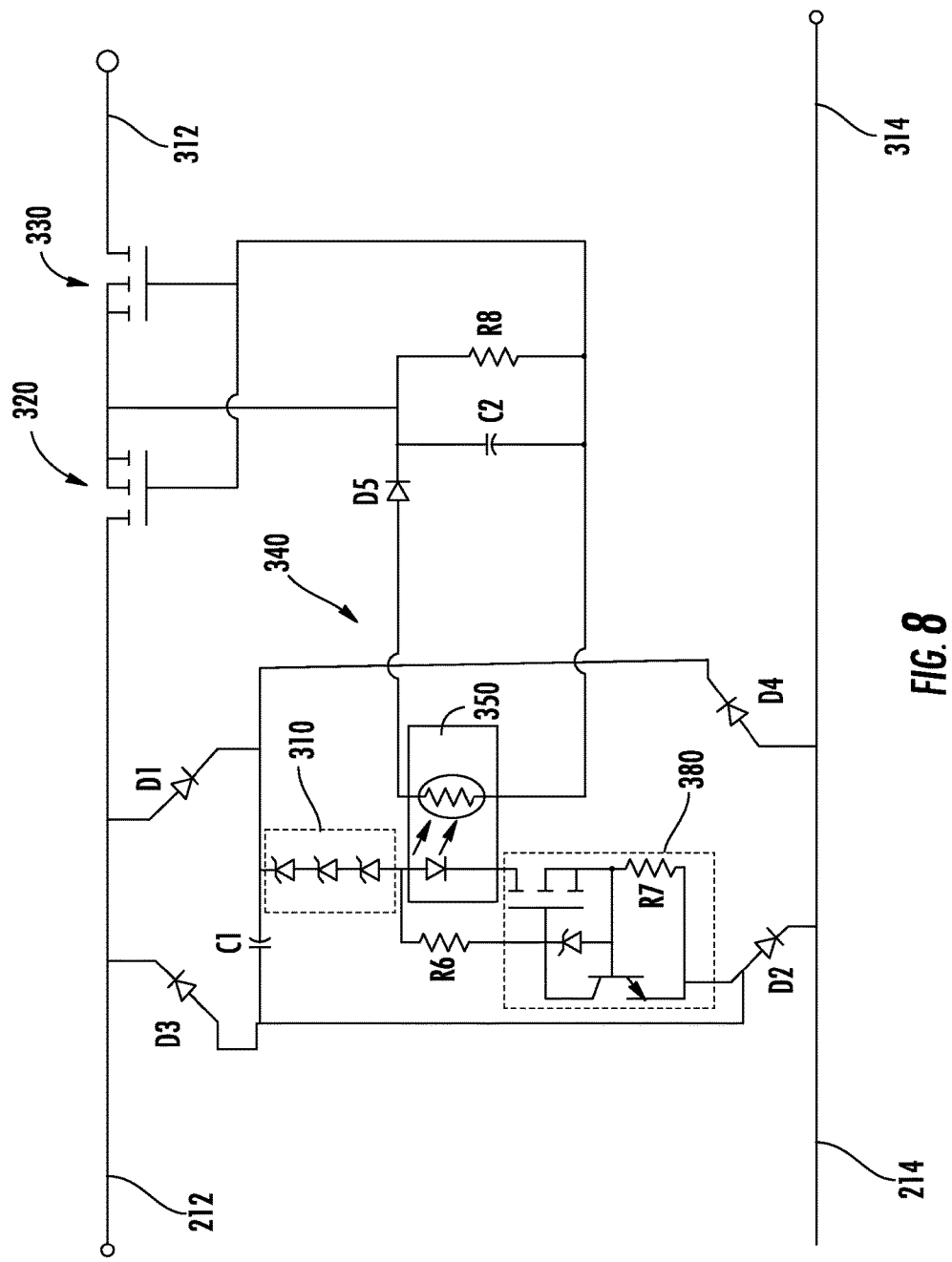
FIG. 8 depicts a circuit diagram of an example overvoltage protection circuit according to example embodiments of the present disclosure.

FIG. 8 depicts an overvoltage protection circuit 300 according to yet another example embodiment of the present disclosure. The overvoltage protection circuit 300 is similar to that of FIG. 7 except that the overvoltage protection circuit 300 of FIG. 8 replaces the current regulator 360 with a current limiting circuit 380. The current limiting circuit 380 includes a MOSFET, BJT, and Zener diode to provide current limiting functionality for the string of Zener diodes 310 and the optocoupler 350.

The example overvoltage protection circuits 300 of FIGS. 4-8 have used MOSFET switching elements 320 and 330 to control the delivery of power to the load based on overvoltage conditions. Those of ordinary skill in the art, using the disclosures provided herein, will understand that other switching elements can be used without deviating from the scope of the present disclosure. For instance, one or more relays can be used as switching elements to control the delivery of power to the load based on the presence of an overvoltage condition without deviating from the scope of the present disclosure.

Figure 9:
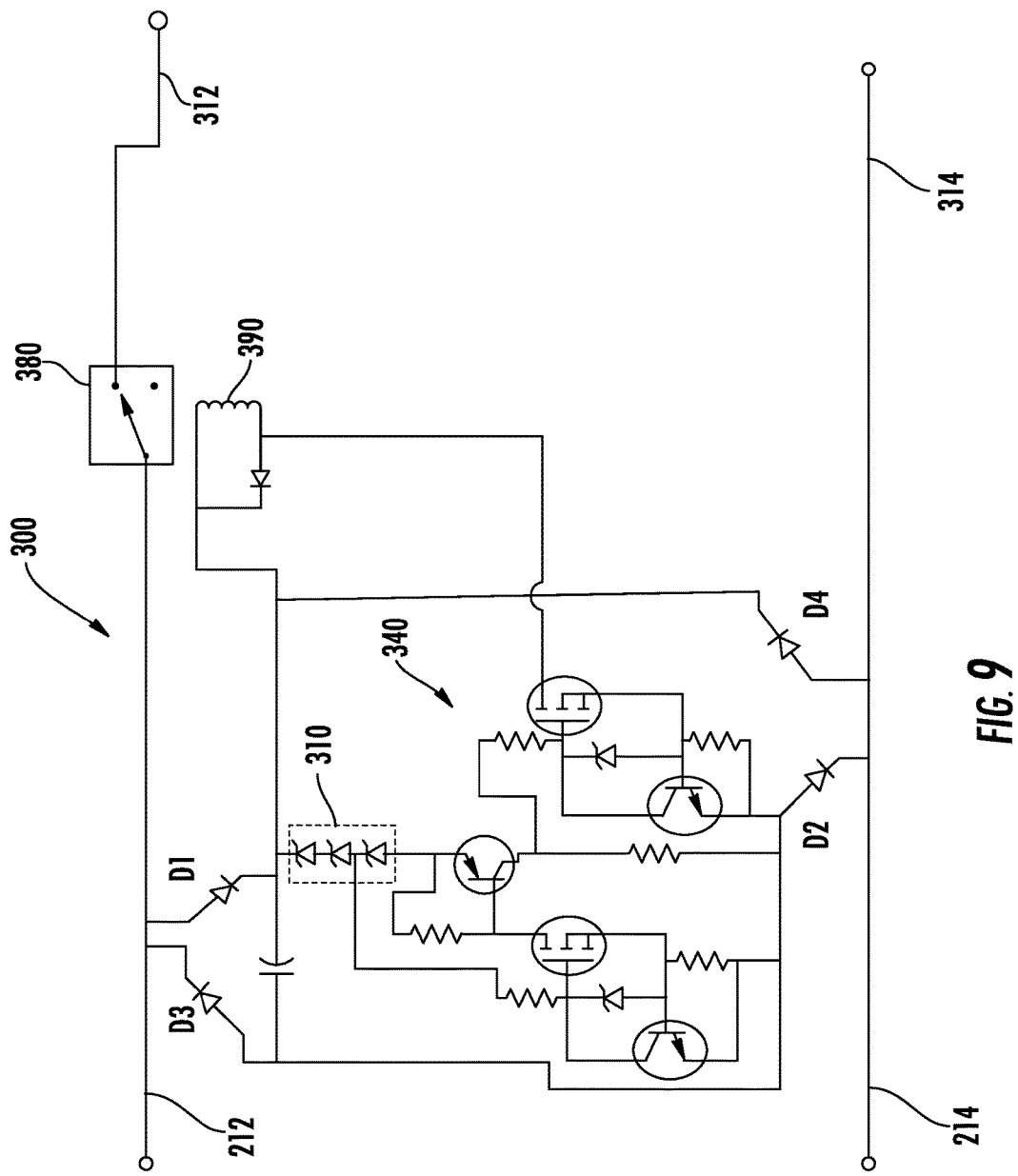
FIG. 9 depicts a circuit diagram of an example overvoltage protection circuit according to example embodiments of the present disclosure.

FIG. 9 depicts one example overvoltage protection circuit 300 that includes a relay switching element 380 that can be controlled to deliver power to the load based on an overvoltage condition. More particularly, overvoltage protection circuit 300 includes a string of Zener diodes 310 and a relay switching element 380. The relay switching element 380 can be configured to be normally in a conducting state so that power flows from the AC inputs 212, 214 to the load via outputs 312 and 314. The string of Zener diodes 310 can be coupled to a gating circuit 340.

The gating circuit 340 can control operation of the relay switching element 380 based on the voltage across the string of Zener diodes 310. For instance, when a voltage across the string of Zener diodes 310 exceeds a threshold level, the gating circuit 340 can energize a coil 290 causing the relay switching element 390 to be in a non-conducting state so that power does not flow from the AC inputs 212, 214 to the load via outputs 312 and 314. When the overvoltage condition has ceased to exist and the voltage across the string of Zener diodes 310 no longer exceeds the voltage blocking capability of the string of Zener diodes 310, the gating circuit 340 can de-energize the coil 390. In this state, the relay switching element 380 can conduct AC power to the load. As shown, the gating circuit 340 can include various combinations of BJTs, Zener diodes, and MOSFETS to provide current limiting functionality as well as to energize coil 390 based on the voltage across the string of Zener diodes 310.

Figure 10:
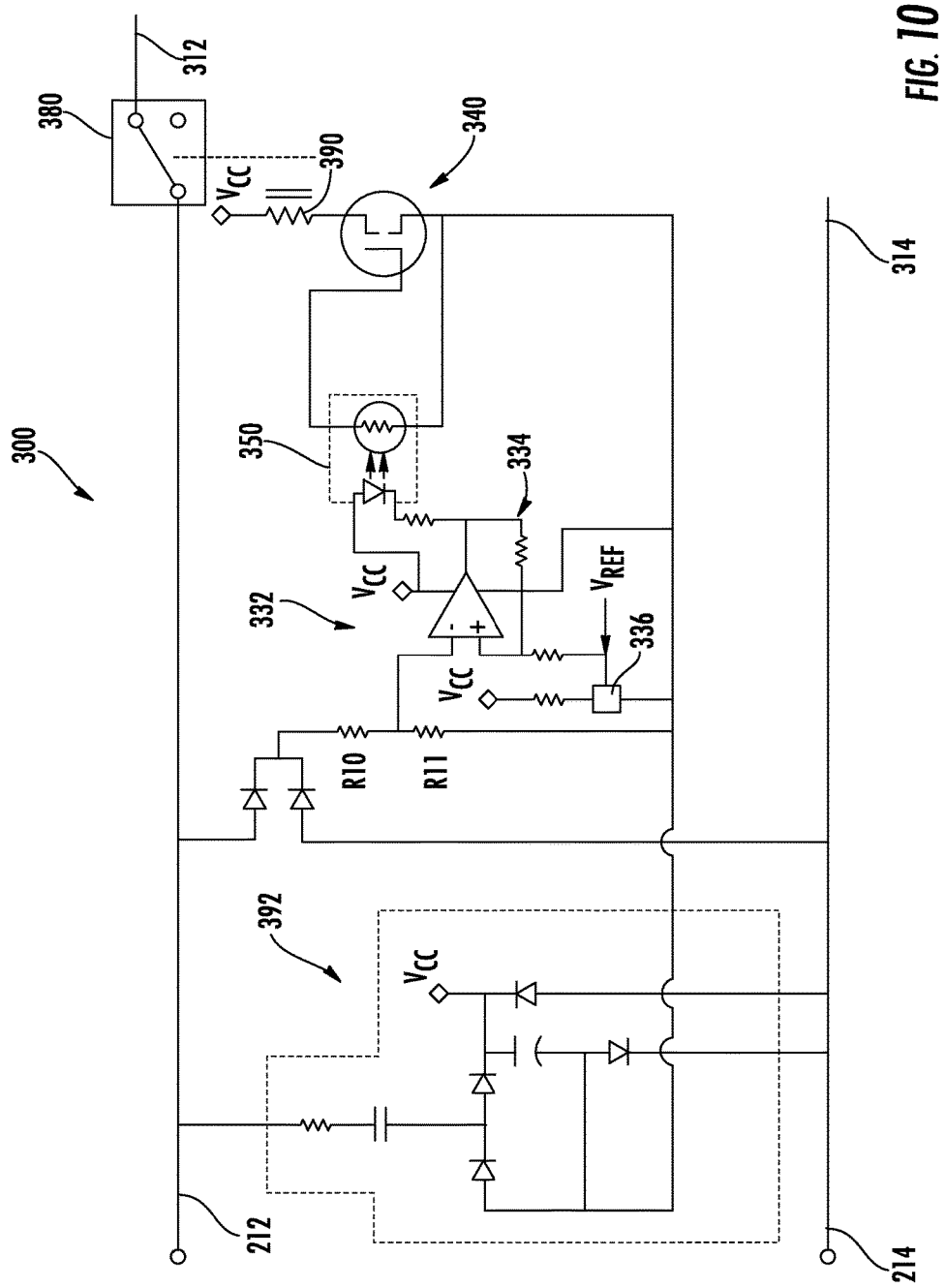
FIG. 10 depicts a circuit diagram of an example overvoltage protection circuit according to example embodiments of the present disclosure.

FIG. 10 depicts an overvoltage protection circuit 300 according to another example embodiment of the present disclosure. The overvoltage protection circuit 300 can include a relay switching element 380 configured to be normally in a conducting state so that power flows from the AC inputs 212, 214 to the load via outputs 312 and 314. The overvoltage protection circuit 300 further includes a voltage sensing circuit 310 and a gating circuit 340. When the voltage sensed at the voltage sensing circuit 310 exceeds a threshold, the gating circuit 340 can control relay switching element 380 to be in a non-conducting state to provide overvoltage protection for the load.

More particularly, the overvoltage protection circuit 300 of FIG. 10 includes a conditioning circuit 392. The conditioning circuit 392 can include various elements (e.g., capacitors, diodes, resistors, etc.) to generate a power supply for various components of the overvoltage protection circuit 300. For instance, the conditioning circuit can generate a voltage Vcc to power various components of the overvoltage protection circuit 300.

The voltage sensing circuit 310 can include a voltage divider formed by resistors R10 and R11. The voltage divider can provide a sensed voltage to comparator circuit 334. Comparator circuit 334 can be coupled to voltage Vcc. The comparator circuit 334 can also receive an input from a voltage reference circuit 336 configured to generate a voltage reference Vref corresponding to a voltage threshold. The voltage reference circuit 336 can be an integrated circuit or other suitable circuit that can be programmed or otherwise configured to provide a constant voltage reference Vref. The voltage reference circuit 336 can also be coupled to Vcc.

The gating circuit 340 can include an optocoupler 350 and a switching element 342 (e.g., a MOSFET). The comparator circuit 334 can compare the sensed voltage from the voltage divider formed by resistors R10 and R11 with the voltage reference Vref. When the sensed voltage does not exceed the voltage reference, the optocoupler 350 can provide no signal to the gate of the switching element 342. In this state, a coil 390 associated with relay switching element 380 is not energized and the relay switching element 380 remains in the normally conducting state.

When the sensed voltage does exceed the voltage reference, the optocoupler 350 can provide a signal to activate the switching element 342 (e.g., providing a gate signal to a gate of the MOSFET) causing the coil 390 to become energized. The energized coil 390 can open the relay switching element 380 causing the relay switching element 380 to be in a non-conducting state for as long as the sensed voltage exceeds the voltage reference Vref. In this way, the overvoltage protection circuit 300 of FIG. 10 provides overvoltage protection for a load.

Figure 11:
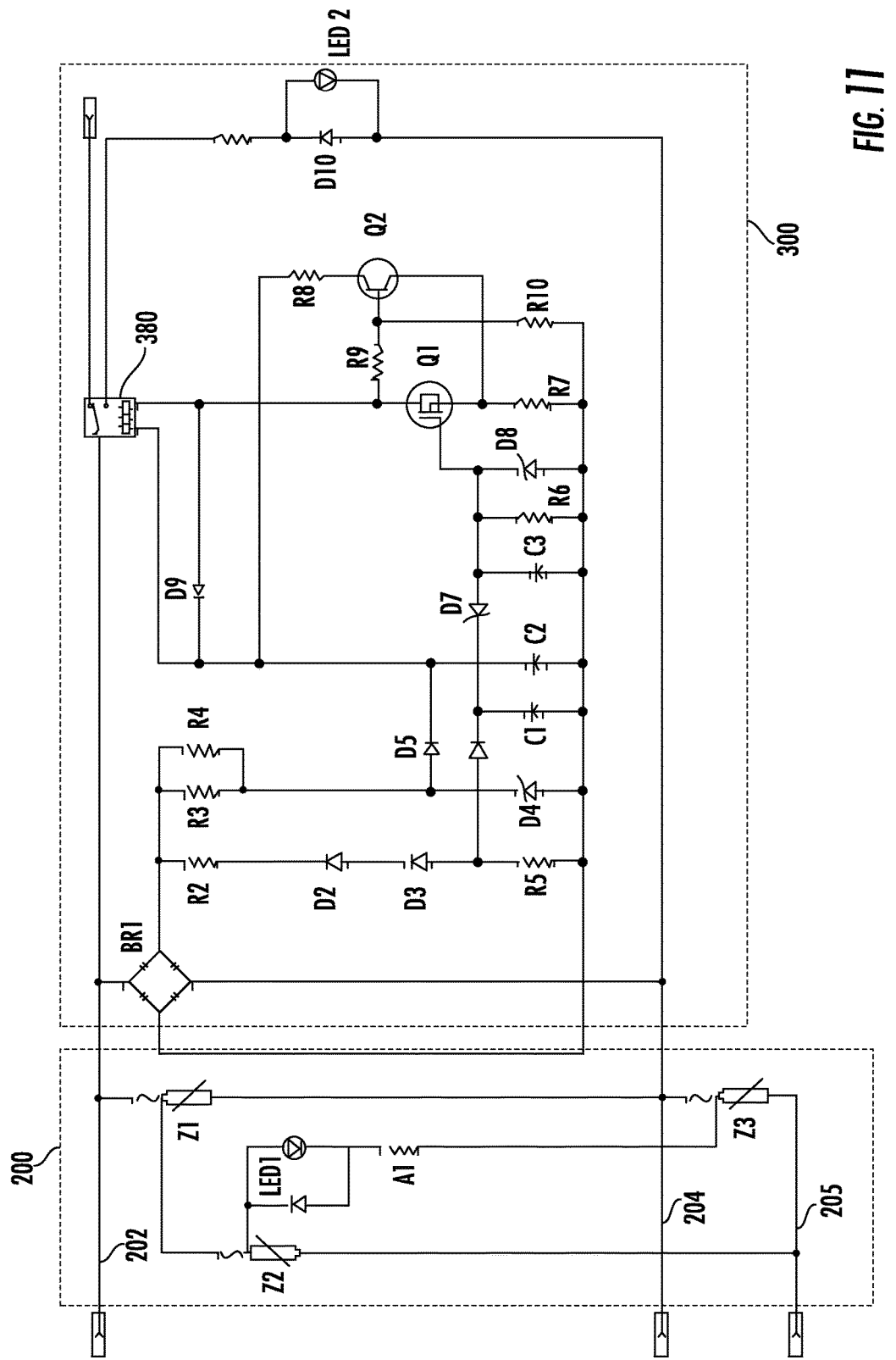
FIG. 11 depicts a circuit diagram of an example overvoltage protection circuit according to example embodiments of the present disclosure.

FIG. 11 depicts a circuit diagram of an overvoltage protection circuit according to example embodiments of the present disclosure. The surge protection circuit 200 includes components Z1, Z2, Z3 D1, Led1, and R1. The overvoltage protection circuit 300 includes all other components.

The overvoltage protection circuit 300 is based on a relay 380 in the normally closed position waiting for a detection of overvoltage in which the relay 380 is activated and the line connection is opened, turning off power to the load. This logic was chosen so that the device would reset itself when the overvoltage condition is no long present. This can reduce any issues of expected switching life since the relay 380 does not have to switch every time the power is turned on. The line voltage on the input to the relay is sampled at bridge rectifier BR1. Off of BR1 main rectifier are two main circuit sections.

The first circuit section is a relay power circuit section adjusted to provide the correct voltage and power to the control coil of the relay 380. The first circuit section includes R3, R4, and Zener diode D4. The relay coil can require, for instance, 110V to operate and therefore D4 can be a 100V Zener diode. D5 and C2 represent a peak detection and bulk storage for control power for the relay control coil. D9 is across the relay control coil itself to clamp stored energy in the relay coil when turned off. The first circuit section further includes Q1, Q2, R7, R8, R9, and R10 and represents the switch circuit of the power circuit which provides for the turning on or off of the relay 380. Q1 is a first switching element (e.g., a MOSFET) that acts as the main switch configured with second switching element Q2 (e.g. a MOSFET) to work as a discrete Schmidt trigger with resistors R9 and R10 providing some hysteresis between the switching on and off based on the detection signal.

The second circuit section off of BR1 is the overvoltage detection signal circuit. The overvoltage detection signal circuit can include resistor R2 and Zener diodes D2, D3 and D7. The overvoltage detection signal circuit can include components C3, R6 and D8 provide filtering and protection for the gate circuit of Q1 which is the input voltage to the Schmidt trigger. When the peak voltage of the line is high enough the detection circuit allows for Q1 to turn on and activate the relay.

There is also an indicator circuit consisting of D10, Led2, and R11 connected to the normally open pole of the relay. If the relay does open due to a detected voltage in excess of the Zener set points in the detection signal circuitry, line voltage is switched to the indication circuit providing a visual indicator the device is in overvoltage protection mode.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A surge protective device, comprising:
    a surge protection circuit comprising one or more surge protective elements coupled between a first AC line input and a second AC line input, one or more surge protective elements coupled between the first AC line input and a reference, and one or more surge protective elements coupled between the second AC line input and the reference;
    an overvoltage protection circuit coupled in series with the surge protection circuit, the overvoltage protection circuit including:
        a voltage sensing circuit associated with a voltage threshold;
        one or more switching elements; and
        a gating circuit coupled to the voltage sensing circuit; wherein the gating circuit is configured to control the one or more switching elements to be in a non-conducting state when the voltage sensing circuit detects a voltage that exceeds the voltage threshold.

2. The surge protective device of claim 1, wherein the gating circuit is configured to control the one or more switching elements to be in a conducting state when the voltage sensing circuit detects a voltage that does not exceed the voltage threshold.

3. The surge protective device of claim 1, wherein the voltage sensing circuit comprises a string of Zener diodes.

4. The surge protective device of claim 3, wherein the voltage threshold corresponds to a voltage blocking threshold associated with the string of Zener diodes.

5. The surge protective device of claim 1, wherein the one or more switching elements comprise a plurality of MOSFET switching elements.

6. The surge protective device of claim 1, wherein the one or more switching elements comprise a relay switching element.

7. The surge protective device of claim 3, wherein the gating circuit comprises a bipolar junction transistor switching element.

8. The surge protective device of claim 7, wherein the string of one or more Zener diodes is coupled to the base of the bipolar junction transistor switching element.

9. The surge protective device of claim 1, wherein the gating circuit comprises an optocoupler.

10. The surge protective device of claim 1, wherein the gating circuit comprises a current regulator.

11. The surge protective device of claim 1, wherein the gating circuit comprises a current limiting circuit.

12. The surge protective device of claim 1, wherein the surge protective elements comprise metal oxide varistors.

13. The surge protective device of claim 1, wherein the surge protection circuit is configured to withstand a voltage from a 480V three phase power source.

14. A surge protective device for a lighting system, the surge protective device comprising:
    a surge protection circuit;
    an overvoltage protection circuit coupled in series with the surge protection circuit, the overvoltage protection circuit including:
        a relay configured to operate in a normally closed position;
        a bridge rectifier; and
        a first circuit section coupled to the bridge rectifier and the relay, the first circuit section configured to control operation of the relay based on an overvoltage detection signal; and
        a second circuit section coupled to the bridge rectifier and the first circuit section, the second circuit section configured to provide the overvoltage detection signal;
        wherein the first circuit section is configured to control the relay to be in an open state when the overvoltage detection signal is indicative of an overvoltage condition.

15. The surge protective device of claim 14, wherein the first circuit section comprises a first switching element and a second switching element configured as a Schmidt trigger.

16. The surge protective device of claim 14, wherein the second circuit section comprises a plurality of Zener diodes.

17. The surge protective device of claim 14, wherein the overvoltage protection circuit comprises an indicator circuit configured to provide a visual indicator when the relay is in an open state.

* * * * *